Dec. 31, 1963   J. F. STEBER   3,115,915
FRUIT AND VEGETABLE PEELER
Filed Aug. 29, 1961   4 Sheets-Sheet 1
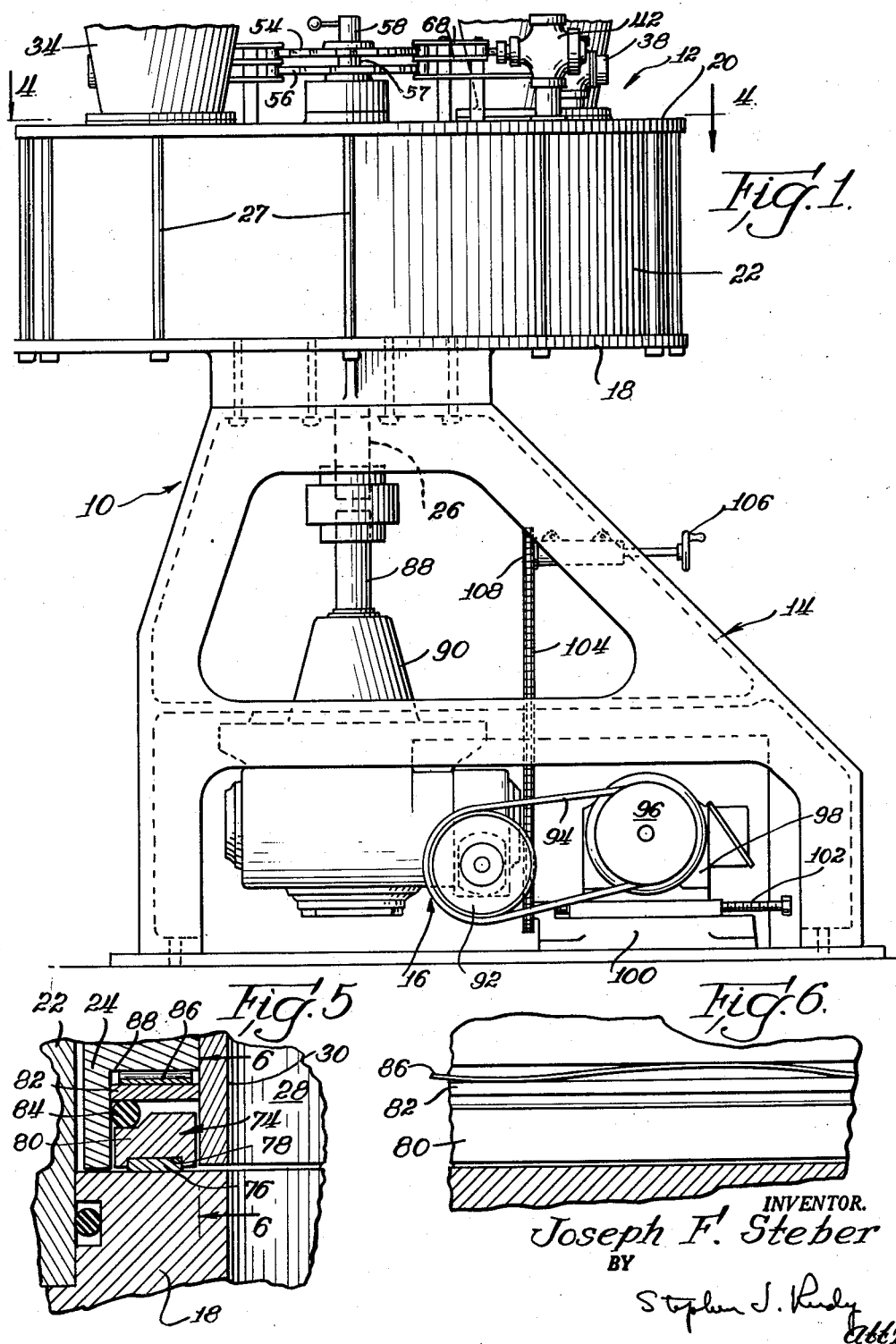
INVENTOR.
Joseph F. Steber
BY
Stephen J. Rudy
atty.

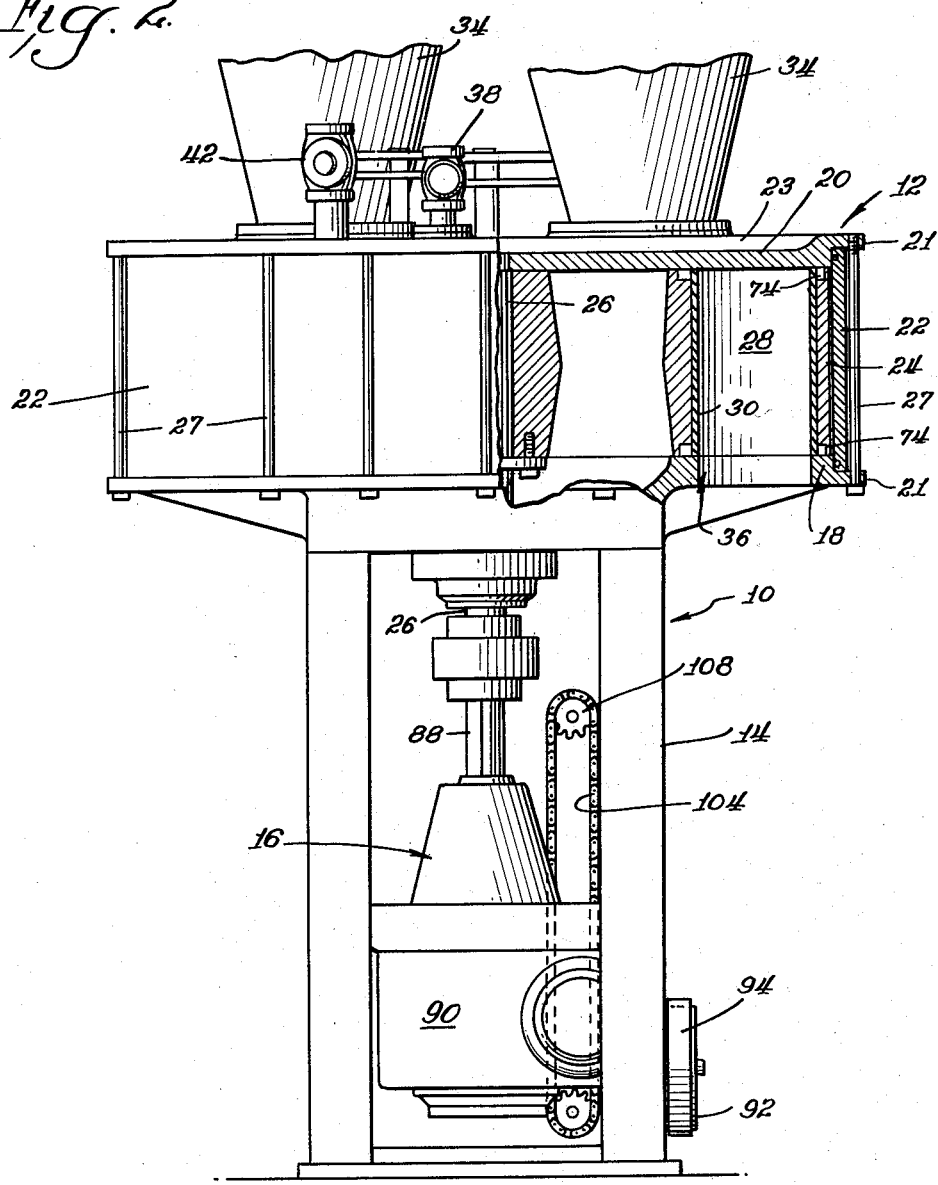

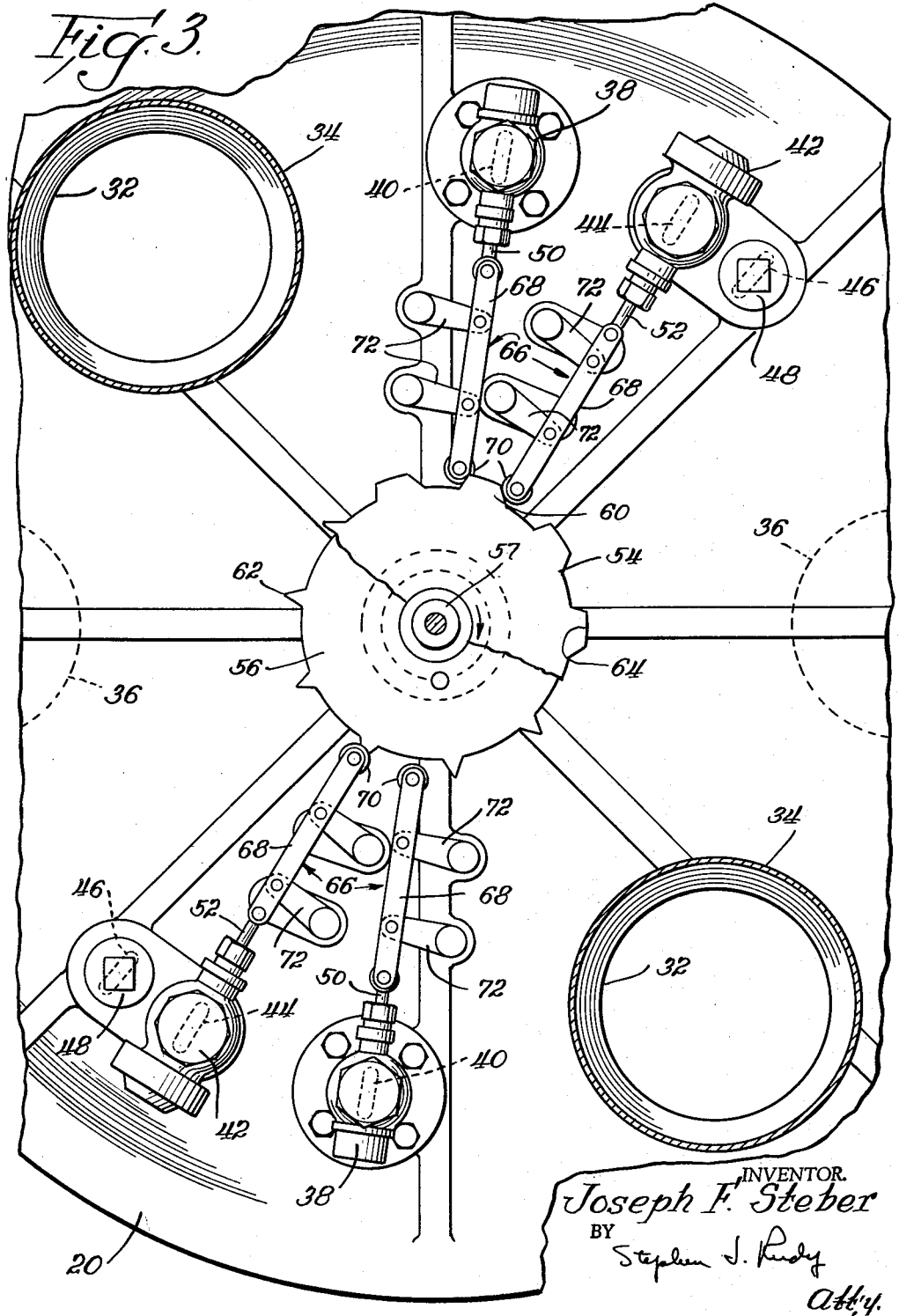

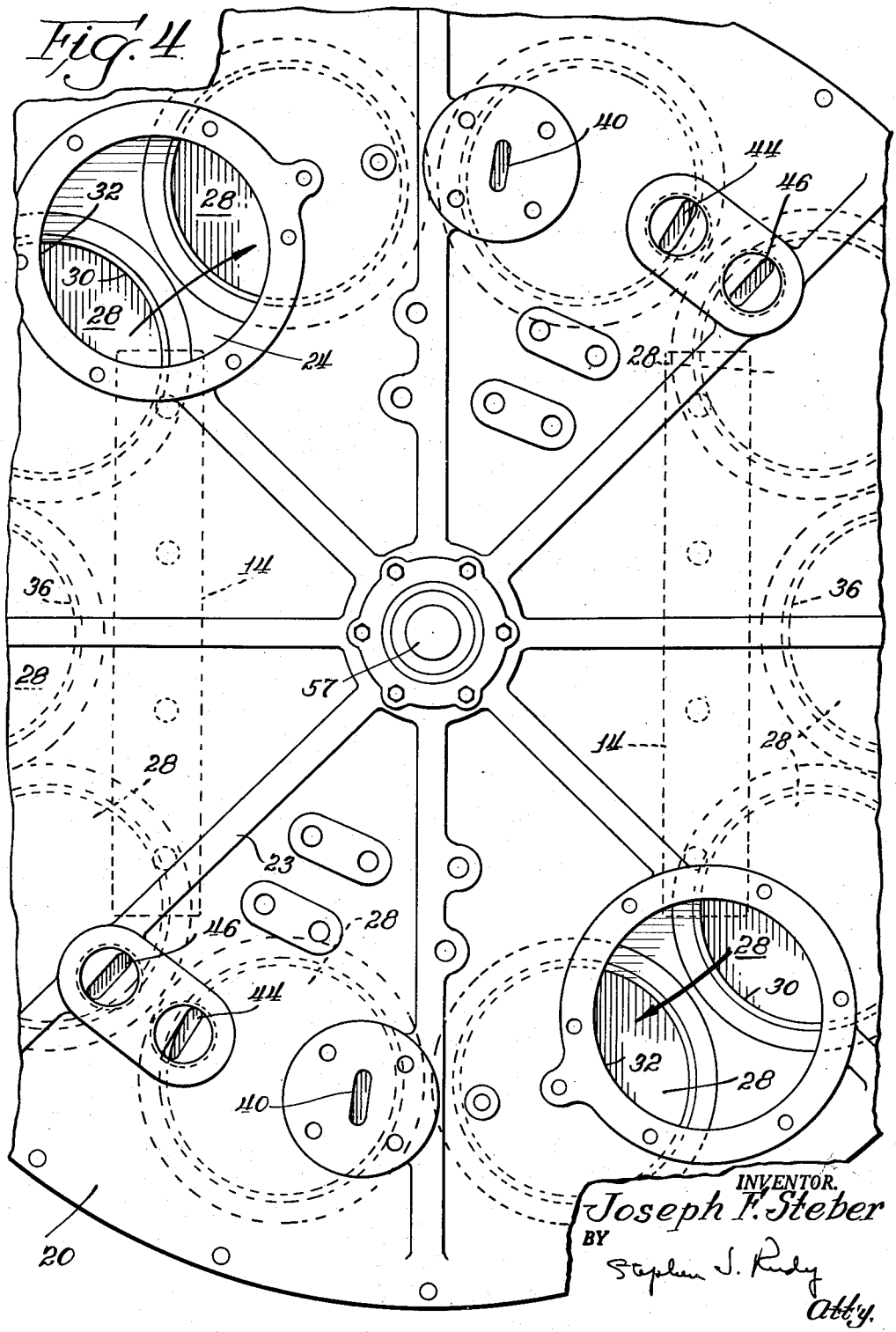

_United States Patent Office_

3,115,915
Patented Dec. 31, 1963

3,115,915
FRUIT AND VEGETABLE PEELER
Joseph F. Steber, Green Bay, Wis., assignor to Green Bay Foundry and Machine Works, Green Bay, Wis.
Filed Aug. 29, 1961, Ser. No. 134,672
7 Claims. (Cl. 146—47)

This invention relates to an improvement in a fruit and vegetable peeler of the type disclosed in Patent 2,429,785, which issued on October 28, 1947, to R. H. Winters.

Among the more important features and advantages which the apparatus of the present invention displays over that of prior art apparatus are: more effective sealing of the ends of peeling chambers which results in significant improvement in overall peeling efficiency; alternate positioning of water valve location to provide optimum steam saturation time for the produce being handled; a rotary cam arrangement for exact and rapid operation of steam and water valves, which cams may be conveniently replaced to provide operating conditions as best suited for the produce being processed; greatly increased capacity with little increase in apparatus size as compared with prior art fruit and vegetable peelers of the same general type; possibility of peeling two different types of produce separately and simultaneously, and; a more favorable diameter to depth ratio utilized in each peeling chamber proportion which provides several advantages, as will be discussed in greater detail hereinafter.

The main object of this invention is to provide an improvement in a fruit and vegetable peeler of the type which uses steam in exploding the skin from the produce being handled.

Another object is to provide a fruit and vegetable peeler wherein the peeling chambers are more effectively sealed resulting in significant improvement in overall peeling efficiency.

Still another object of the invention is to provide optimum steam saturation time by a simple repositioning of a water valve.

Another object is to provide a fruit and vegetable peeler wherein the operation of steam and water valves is effected in an exact and rapid manner.

An object of the invention is to provide a fruit and vegetable peeler wherein valve operating cams may be easily and quickly changed to alter peeling cycle time as desired.

A further object is to provide a fruit and vegetable peeler having greatly increased capacity with little increase in apparatus size as compared with generally similar apparatus of the prior art.

Another object is to provide a fruit and vegetable peeler having a more favorable diameter to depth ratio in peeling chamber proportion.

Still another object is to provide a fruit and vegetable peeler wherein two different types of produce may be separately and simultaneously peeled.

These and other objects and features of the invention will become more apparent from the following description and accompanying drawings wherein:

FIG. 1 is an elevation view of apparatus representing an embodiment of the invention;

FIG. 2 is the same but taken at 90° from that of FIG. 1 and showing part of the apparatus in cross section;

FIG. 3 is a top view, somewhat enlarged, of the apparatus of FIG. 1;

FIG. 4 is a fragmentary view, somewhat enlarged, generally as seen along line 4—4 in FIG. 1;

FIG. 5 is an enlarged section view showing a seal arrangement used in the apparatus of FIG. 1; and FIG. 6 is a view generally as seen along line 6—6 in FIG. 5.

Referring now to the drawings and more particularly to FIGS. 1 and 2, numeral 10 identifies apparatus comprising a fruit and vegetable peeler illustrative of an embodiment of the invention. Basically, the apparatus includes a peeler drum assembly 12, a base or stand 14 arranged for support of the drum assembly, and a variable speed drive arrangement 16 mounted in the base 14.

The drum assembly 12 includes a round bottom plate 18, a round top plate 20, a cylindrical spacing drum 22 positioned between flanges 21 of said plates, and a pocket wheel 24 arranged within the drum and between the plates. Use of the drum 22 assures accurate spacing between the top and bottom plates. The pocket wheel 24 is secured to a drive shaft 26 which is power driven to provide rotary movement to the wheel. Bolt means 27 extending through the flanges 21 may be used to draw the plates into tight engagement with the spacing drum 22. Each plate 18 and 20 may be provided with strengthening ribs 23 radially arranged on the exterior surface.

The pocket wheel 24 is formed to provide a plurality (preferably ten in number) of open-ended equiangular spaced peeling chambers, or pockets 28, which are cylindrical in form with the axes thereof being parallel with the drive shaft 26 and of equal radial distance therefrom. A liner 30, preferably made of stainless steel or other corrosive resistant material, is arranged in each peeling chamber. A peeling chamber ratio of diameter to depth in the order of 1 to 1½ is preferably utilized.

The top plate 20 is provided with a pair of round openings 32 which are 180° apart, and which have a diameter substantially equal to the inner diameter of the liners 30, and a center which is of the same radial distance from the shaft 26 as that of the chambers 28. An inlet hopper 34 may be mounted atop each opening 32 for receipt of fruit or vegetables to be fed into the peeling chambers 28 as they pass beneath the openings.

The bottom plate 18 is likewise provided with a pair of round openings 36 of similar size and radial spacing as openings 32, but angularly spaced so that a given peeling chamber 28 will move through an arc of approximately 126° from center to center of an opening 32 and an opening 36 respectively, when the pocket wheel is rotated in a clockwise direction (FIG. 4). The dual charging openings 32 and discharging openings 36 allow for peeling of two different types of produce, i.e., peaches and tomatoes separately and simultaneously in the apparatus.

Means are provided for admitting steam and cold water in sequential order to each peeling chamber 28 after it has been loaded with the fruit or vegetables to be peeled. For such purpose, a pair of steam valves 38 are secured to the top plate 20, which valves are adapted to direct steam into diametrically arranged slots 40 passing through the top plate. A pair of water valves 42 are likewise secured to the top plate 20, which valves are adapted to direct cold water into either of two pairs of slots 44, 46, passing through the top plate. As best seen in FIGS. 3 and 4, the center of the slots 40, 44 and 46 coincide with a circle passing through the center of the openings 32. Hose means (not shown) are connected to the valves 38 and 42 for delivery of steam and water respectively thereto, as required in any given peeling operation.

The purpose of having two slots, i.e., 44 and 46, for delivery of water to a peeling chamber, is so that the valve 44 may be selectively applied to these slots to provide at least two rotary positions of a peeling chamber 28 for receipt of water. For example, when a shorter steam period is desired in a peeling chamber, the valve 42 is connected for delivery of water into a slot 44, and when a longer steam period is desired, the valve 42 is connected for delivery of water into a slot 46. In such manner, the apparatus may be conditioned for proper handling of produce having a thin or more easily removed skin, as achieved by a shorter steam saturation period, or for handling of produce having a thick or less easily removed skin, as achieved by a longer steam saturation period. Whichever slot 44 or 46 is not being utilized, may be closed by a pipe plug 45.

The valves 38 and 42 are of the normally closed, spring-loaded type, which are opened upon application of an axial thrust force upon a valve shaft, or stems 50 and 52 respectively. To effect the required opening of the valves in timed sequence during a peeling operation, cams 54 and 56 are provided which are mounted upon an upper extension 57 of the drive shaft 26. A knob 58 is threadably mounted on the end of the extension 57 which allows for convenient removal of either or both cams. Cam 54, which is adapted for operational control of the water valves 42, has a plurality of peripheral teeth 60, of like number to that of the peeling chambers 28 (in this case, ten), while cam 56, which is adapted for operational control of the steam valves 38, has a plurality of peripheral teeth 62, also of like number to that of the peeling chambers. The respective teeth are designed to provide the desired open time of the steam and water valves, and in this connection it will be noted that teeth 62 are rather sharply pointed, while teeth 60 each have a flat crest 64. Cams 54 and 56 may be made with differing sets of teeth to provide change of valve operating cycle. In such manner, the apparatus may be adjusted to provide optimum operating conditions for a particular produce being handled.

The cams 54 and 56 are angularly positioned relative to each other on the shaft 57 so that the teeth 62 of the steam valve operating cams 56, lead the teeth 60 of the water valve operating cams 54 when the shaft 57 is rotated clockwise as indicated.

An actuating arm assemblage 66, arranged for operation of each of the valves 38 and 42, extends between a given valve and a related cam. Each assembly 66 includes a pair of parallel arranged links 68, one end of which is connected to a valve stem 50 or 52, the other end pivotally supporting a roller 70 which is engageable with a cam 54 or 56, as the case may be. Each cam assembly 66 is supported for longitudinal movement by a pair of parallel arranged arms 72, one end of each being pivotally secured to the top plate 20, while the other end is pivotally affixed to the links 68. It will be seen that as the cams 54 and 56 rotate in unison with the pocket wheel 24, the arm assemblages 66 will cause operation of the steam valves 38, followed by operation of the water valves 42, in sequential and repetitive manner.

In order to assure effective sealing between the pocket wheel 24 and the plates 18 and 20 during operation of the apparatus 10, each peeling chamber is provided with a seal assembly 74 at each end. The seal assembly 74 includes a circular wearing seal 76, which preferably may be made of material produced by the Johns Manville Company and known as "Elslip No. 52." The seal 76 is positioned in a recess 78 formed in a bronze seal ring 80, whereby one face of the seal 76 is maintained in engagement with the top or bottom plate 20 or 18 respectively. A backer ring 82 is arranged to maintain an O ring 84 under compression against the seal ring 80, said ring 84 being urged toward the ring 80 by a circular stainless steel spring 86, which, as best seen in FIG. 6, has an equal amplitude wave-like configuration when viewed edgewise. The structural arrangement of the spring 86 provides a uniform pressure so that a snug sliding engagement is effected between the seal 76 and the surface of the plate. The entire seal assembly is arranged in a cavity defined in part by a recess 88 formed in the chamber wall of the pocket wheel 24, and the end of each liner 30.

It will be noted that a slight clearance is provided between the end of the liner 30, pocket wheel 24, and seal ring 80, and the adjacent surfaces of the top and bottom plates 20 and 18, so that only the exposed surface of the wearing seal 76 is in sliding engagement with said plates.

The shaft 26 is coupled to a drive shaft 88 of a reduction gear 90, which is supported in the base 14 and which forms a component of the drive arrangement 16. The gear 90 includes a pulley 92 which is driven by a belt 94 arranged upon a variable speed motor pulley 96 the components, or halves, of which are movable to change the effective radius of belt engagement.

An electric motor 98 drives the pulley 96, which motor is mounted upon an adjustable motor base 100. The latter includes a screw means 102, rotatable by a chain 104, which is moved by a manually operable wheel 106 connected to the chain by a sprocket 108. By rotating the wheel 106, the position of the motor relative to the reduction gear may be changed thus changing the distance between the center of the pulley 96 relative to the pulley 92. As a result, the lateral spacing of the variable speed pulley halves may be increased or decreased, as the case may be, resulting in decrease or increase respectively in belt speed. The variable speed motor pulley 96 is, of course, well known in the art, and may be similar to that of the Borg-Warner Corporation, catalog No. VPJ-6. Change in belt speed results in change in speed of the drive shaft 26. In such manner, an almost infinite number of rotary speeds of the pocket wheel 24, may be obtained, thus making the apparatus adjustable to effect optimum operation when used for peeling a given type of fruit or vegetable. An average speed which will be found satisfactory for many peeling operations is one revolution per minute.

The operation of the apparatus 10 briefly is as follows: The produce to be peeled is fed into the hoppers 34 so that each peeling chamber 28 is substantially filled as it passes beneath an opening 32. When a loaded chamber is rotated to a position beneath a steam slot 40, the steam valve 38 is opened causing flooding of the chamber with steam. As explained in greater detail in the patent to Winters supra, the moisture immediately below the skin surface of the produce being peeled, is thus raised to approximately the temperature of the steam at the prevailing steam pressure. When a given chamber 28 passes beneath a slot 44 (or 46), a water valve 42 is opened, thus directing cold water into the chamber and causing immediate condensation of the entrapped steam in the chamber, and a reduction of pressure in the chamber to substantially vacuum condition. At this reduced pressure, the subcutaneous high temperature of the moisture beneath the skin of the produce, causes immediate vaporization of the moisture resulting in the explosive rupture of the produce skin, leaving a substantially skinless or peeled product. As the peeling chamber 28, with the peeled produce moves over the opening 36, the produce is gravity discharged into a container (not shown) for further handling.

The conditions of time and steam temperature and pressure for use in the apparatus of the invention, must be observed relative to the type and condition of the fruit, or vegetables, being processed. Such data may be easily established after a few trial runs utilizing samples of the produce which is to be peeled. In this connection, the manufacturer of the apparatus may supply tables recommending times, temperatures and pressures for the various fruits and vegetables to be processed in apparatus of his manufacture.

The provision for rotary speed adjustment of the pocket wheel 24, as well as the alternate positioning possibilities of the water valves 42, affords exact timing of a given peeling operation so that the produce is not cooked, or otherwise injured before discharge from the apparatus.

Also the dual feed and discharge arrangement, as provided by the two loading and unloading openings 32 and 36 respectively, affords greatly increased capacity with disproportionately small increase in apparatus size. This makes for higher volume potential, and much faster processing on a regular operational line in a commercial canning establishment. Apparatus made in accordance with the principles of the invention, for example, is capable of handling five tons of tomatoes per hour, whereas the volume rate of similar apparatus of the prior art will be found to be in the neighborhood of one ton per hour. The use of the apparatus for peeling two different types of produce separately and simultaneously, has been mentioned hereinbefore.

Attention is directed to the diameter to depth ratio of approximately 1 to 1½ of the peeling chambers 28. A comparable ratio for the peeling chambers of similar apparatus of the prior art has been more in the order of 1 to 7. The smaller ratio, as utilized by the apparatus of the present invention affords singular advantages such as: more rapid filling of each peeling chamber; less danger of produce damage as may occur in a narrower and deeper peeling chamber due to higher dropping and packing effect; ability to handle produce of various sizes including largest sizes common to any species of produce; and more rapid and uniform steam saturation.

From the foregoing it will be seen that the apparatus described will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. Apparatus for peeling produce comprising in combination, an assembly including a top plate and a bottom plate secured in parallel spaced relationship, and a pocket wheel mounted for rotation between said plates, said pocket wheel being formed to provide a plurality of substantially equal diameter cylindrical peeling chambers the axis of each being parallel with and of equal radial distance from the axis of the pocket wheel, said plates each being formed to provide a pair of diametrically spaced openings of similar diameter and radial spacing as the diameter and radial spacing of each peeling chamber whereby the apparatus may be loaded and unloaded from two arcuate spaced positions, said bottom plate openings being arcuately spaced from said top plate openings, valve means adapted to admit steam and cold water sequentially to each of said peeling chambers after they are moved past an opening in the top plate, cam means rotatable with the pocket wheel and adapted to cause operation of said valve means, and circular seal means supported at each end of the peeling chambers for movement with the pocket wheel, each seal means being concentric with the peeling chamber and being urged into sliding arrangement with an adjacent plate.

2. Apparatus according to claim 1 wherein variable drive speed means are arranged to rotate said pocket wheel, said drive means including a manually controlled means for adjusting the speed thereof.

3. Apparatus according to claim 1, wherein cam means are affixed to a shaft adapted to rotate said pocket wheel, said cam means each having teeth about the periphery of like number to the number of peeling chambers, and an activating arm assemblage extending between each cam and valve whereby rotation of said cams will cause operation of said valves.

4. Apparatus according to claim 1, wherein said top plate is formed to provide two pairs of arcuate spaced openings so that each of said water valves are positionable in either of two positions for admitting water to a peeling chamber.

5. Apparatus according to claim 1, wherein said sealing means includes a wearing seal, a seal ring formed to provide a recess for the positional support of said wearing seal, and a resilient means arranged for urging said seal ring toward the wearing seal so that the latter will be maintained in snug sliding engagement with the inner surface of a plate.

6. Apparatus according to claim 5, wherein said resilient means comprises a circular spring having an equal amplitude wave-like configuration when viewed edgewise.

7. Apparatus according to claim 1, wherein said peeling chambers each have a diameter to depth ratio of approximately 1 to 1½.

References Cited in the file of this patent

UNITED STATES PATENTS

| | | |
|---|---|---|
| 2,014,325 | Grilli | Sept. 10, 1935 |
| 2,429,785 | Winters | Oct. 28, 1947 |
| 2,638,137 | De Back | May 12, 1953 |